United States Patent [19]

Jankowiak et al.

[11] Patent Number: 4,799,907
[45] Date of Patent: Jan. 24, 1989

[54] SURVIVAL APPARATUS

[75] Inventors: Roman Jankowiak, Cheektowaga, N.Y.; John A. Lutocka, Jr., Seminole, Fla.

[73] Assignee: Conax Florida Corporation, St. Petersburg, Fla.

[21] Appl. No.: 10,455

[22] Filed: Feb. 3, 1987

[51] Int. Cl.$^4$ .......................................... B63B 21/52
[52] U.S. Cl. ......................................... 441/42; 441/83; 244/107
[58] Field of Search ......................... 244/1 R, 137, 107; 441/42, 80, 83, 85, 88, 93, 96, 97; 403/261, 326

[56] References Cited

U.S. PATENT DOCUMENTS

| | | | |
|---|---|---|---|
| 2,264,321 | 12/1941 | Manson | 244/107 |
| 2,671,623 | 3/1954 | Toulmin, Jr. | 244/1 R |
| 2,940,700 | 6/1960 | Trannoy | 244/107 |
| 3,175,236 | 3/1965 | Bagdassarroff | 441/42 |
| 3,176,937 | 4/1965 | Labrecque et al. | 244/107 |
| 3,189,301 | 6/1965 | Parkes | 244/107 |
| 3,886,612 | 6/1975 | Schnirel et al. | 441/85 |
| 3,962,740 | 6/1976 | White | 114/68 |
| 4,024,440 | 5/1977 | Miller | 361/251 |
| 4,094,028 | 6/1978 | Fujiyama et al. | 222/3 |
| 4,482,333 | 11/1984 | Geri et al. | 441/93 |
| 4,500,014 | 2/1985 | Zimmerly | 222/5 |

FOREIGN PATENT DOCUMENTS

| | | | |
|---|---|---|---|
| 0061398 | 9/1982 | European Pat. Off. | 441/83 |
| 1122399 | 1/1962 | Fed. Rep. of Germany | 441/42 |
| 8201860 | 6/1982 | PCT Int'l Appl. | 441/85 |

Primary Examiner—Joseph F. Peters, Jr.
Assistant Examiner—Edwin L. Swinehart
Attorney, Agent, or Firm—Christel, Bean & Linihan

[57] ABSTRACT

Survival apparatus for an aircraft or the like. The survival apparatus includes a survival canister 12 in which survival gear is stowed. The canister assembly is buoyant and water tight. It is stowed prior to use in a cylindrical member 16 which is closed at one end. A maintaining structure 74 is provided to normally maintain the canister assembly 12 within the cylindrical member 16. A handle assembly 90 is provided to provide for the manual withdrawal of the assembly 12 from the cylindrical member 16, the handle assembly also engaging the maintaining structure and causing it to release the canister assembly upon application of force in one direction. A condition responsive gas discharge apparatus 14 is disposed in the closed end of the cylindrical member 16 and, in the event of an accident, it can forceably eject the canister assembly from the cylindrical member.

15 Claims, 3 Drawing Sheets

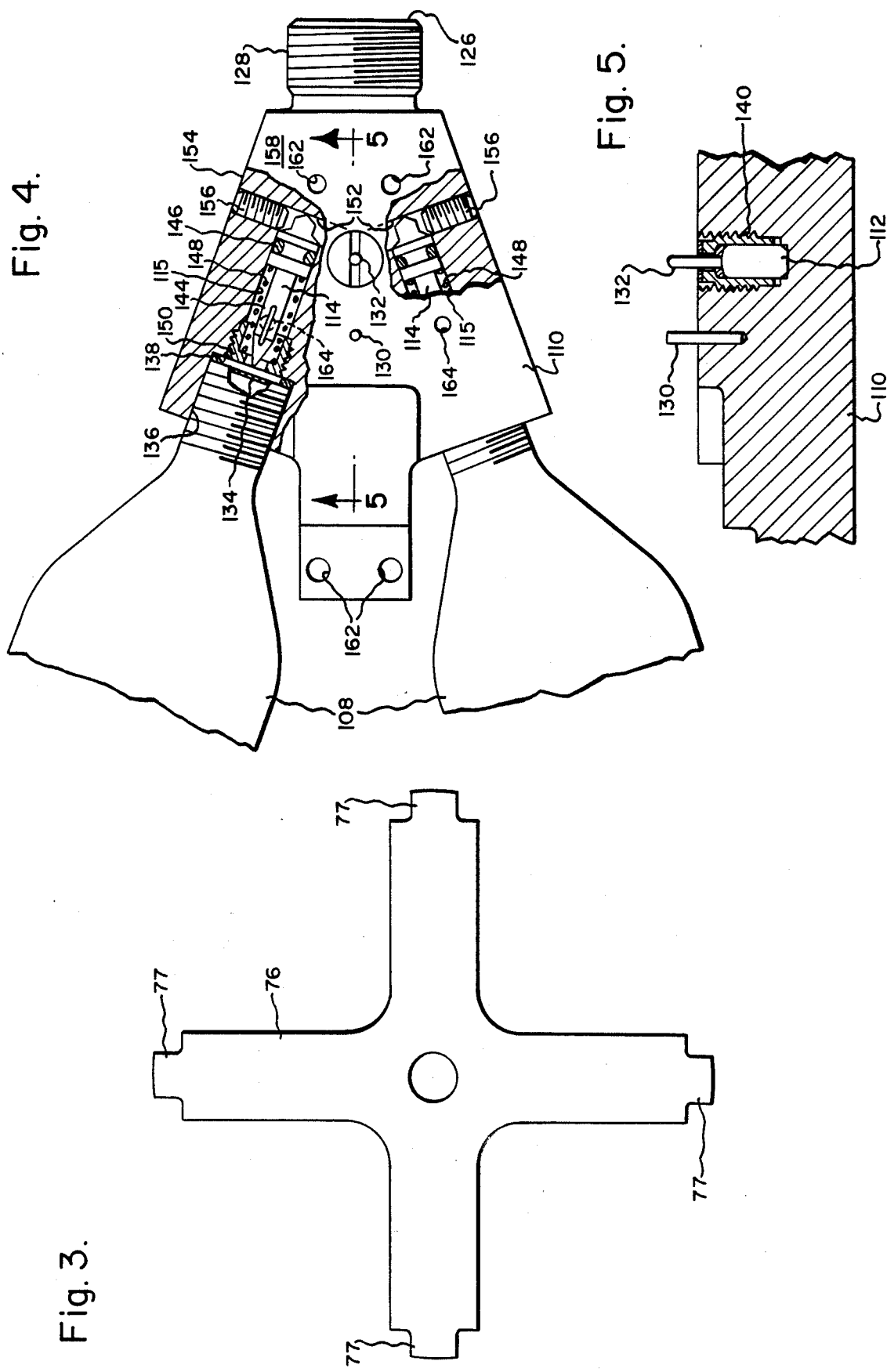

SURVIVAL APPARATUS

TECHNICAL FIELD

The present invention relates generally to survival apparatus, and more particularly to survival apparatus including a buoyant canister assembly containing survival equipment, which canister assembly is stowed in a cylindrical member, and which can be removed from the cylindrical member either manually or through the operation of a gas discharge apparatus which includes condition responsive means capable, in response to an accident, of causing the canister assembly to be ejected from the cylindrical member.

BACKGROUND OF THE INVENTION

If a helicopter makes a crash landing in water, it tends to become inverted and the crew only has an extremely short time period within which to escape from the helicopter. While the helicopter carries a considerable amount of survival equipment, typically there is not sufficient time for the crew to take the survival equipment with them as they escape from the craft.

OBJECTS AND SUMMARY OF THE INVENTION

It is a principal object of the present invention to provide a survival apparatus for a craft which automatically ejects a canister assembly from the craft in the event of an accident, the canister assembly being loaded with survival gear.

More specifically, it is an object of the present invention to provide a buoyant canister assembly containing survival equipment, which canister assembly can be manually withdrawn from a cylindrical member, such as a missile tube, or, in the event of a crash landing in water, which will be forceably ejected from the cylindrical member.

Additionally, it is an object of the present invention to provide a survival apparatus including a survival canister assembly which is normally stowed within a cylindrical member such as a missile tube, maintaining means which will normally maintain the canister assembly within the cylindrical member, manually engageable means which are capable of engaging the canister assembly and releasing the maintaining means to permit the manual withdrawal of the canister assembly from the missile tube, and a gas discharge apparatus including condition responsive means capable of causing the survival canister assembly to be ejected from the cylindrical member in response to a crash landing in water.

The above objects and other objects and advantages of this invention will become more apparent from a consideration of the following detailed description taken in conjunction with the accompanying drawings in which a preferred form of this invention is illustrated.

BRIEF DESCRIPTION OF THE DRAWINGS

FIG. 3 is a view taken generally along the line 3—3 in FIG. 2 illustrating a spider which is used to maintain the canister assembly within the missile tube.

FIG. 4 is an enlarged detail view of a portion of the gas discharge apparatus illustrated in FIG. 1, this view being partially in section.

FIG. 5 is a section taken generally along the line 5—5 in FIG. 4.

DETAILED DESCRIPTION

Figure 1:
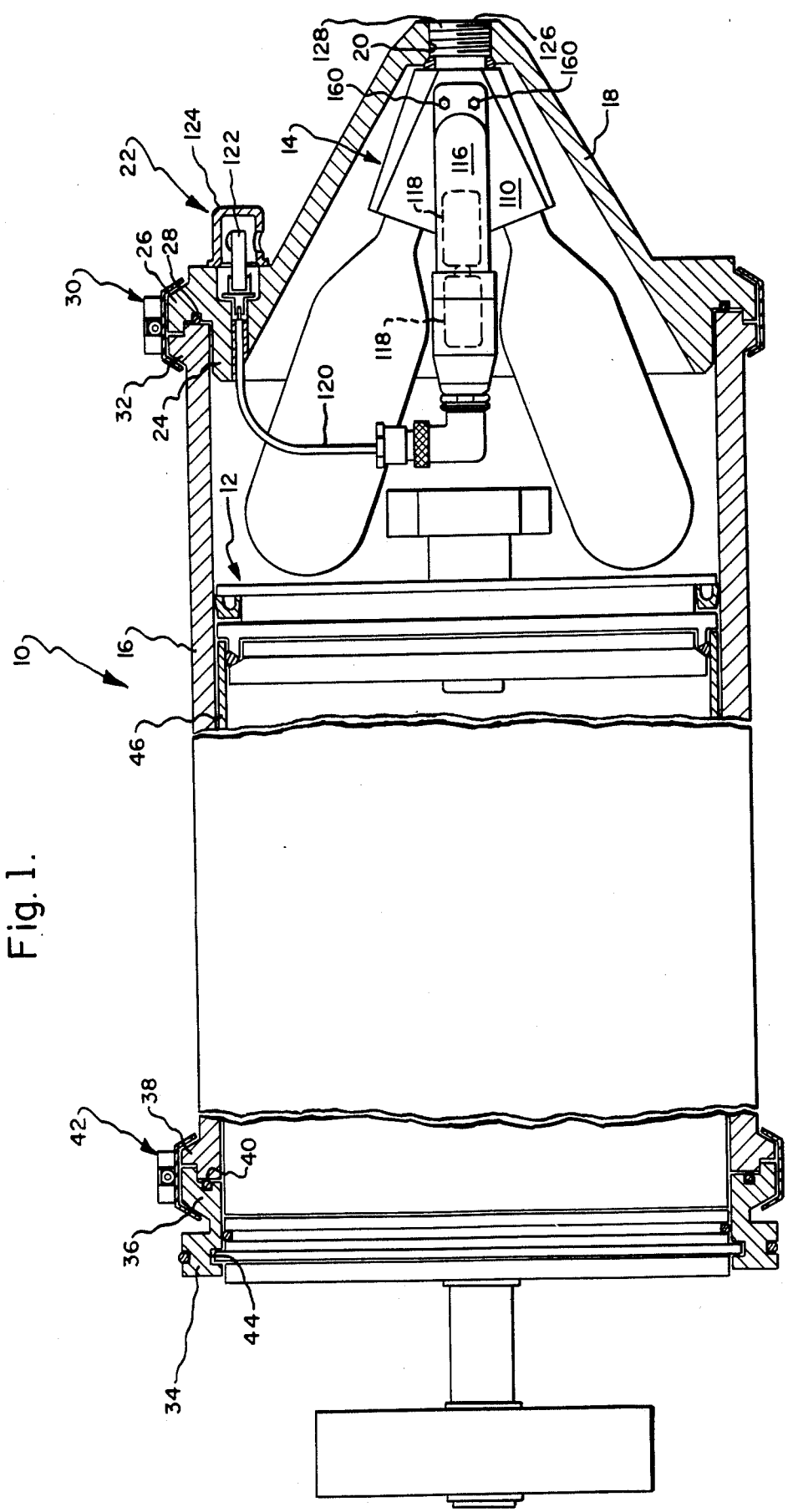
FIG. 1 is a side view, partially in section, showing the survival apparatus of the present invention, which apparatus includes a survival canister assembly disposed within a missile tube closed at one end, and a gas discharge apparatus disposed in a closed end of the missile tube.

Referring first to FIG. 1, for the convenience of the reader the structure shown to the left will be referred to as the front and the structure to the right will be referred to as the rear. The survival apparatus of the present invention is indicated generally at 10. It includes a survival canister assembly indicated generally at 12, and a gas discharge assembly indicated generally at 14, both of which are mounted within a cylindrical member 16, which in the illustrated embodiment is a missile tube of the type typically found on armed forces attack helicopters. While the missile tube is normally open at both the front and rear ends, as can be seen from FIG. 1, in accordance with this invention, it is closed at the rear end by a conical member 18. The conical member 18 is provided with a centrally located threaded aperture 20 into which the rear end of the gas discharge apparatus 14 is threaded. In addition, the conical member is also provided with a suitable aperture which receives a sensor plug assembly indicated generally at 22, which aperture is sealed when the sensor plug assembly is assembled therein. The conical member is additionally provided with a cylindrical portion 24 which is adapted to be telescopically received within one end of the cylindrical member 16, and a radially outwardly extending flange portion 26 which is provided with an annular groove on one face, the annular groove receiving an O-ring 28 which is adapted to abut against the rear end of the missile tube 16. The conical member 18 is in turn secured to the rear end of the missile tube by a clamp assembly 30. The clamp assembly 30 consists of two semi-circular members each having a generally U-shaped cross section as illustrated in FIG. 1, which members are hinged together at one end (not illustrated) and which can be drawn tightly about a tapered boss 32 at the rear end of the missile tube and corresponding structure in the flange portion 26 of the conical member 18 by a conventional screw assembly. When the conical member 18 and gas discharge apparatus 14 are secured to the rear end of the tube, the rear end of the tube is effectively closed against the passage of fluid.

An extension 34, which has a cylindrical internal bore of the same internal diameter as the tube 16 is secured to the front end of the missile tube in the same manner that the conical member 18 is secured to the rear end of the tube. Thus, the extension 34 has a tapered flange portion 36 and the front end of the missile tube 16 also has a corresponding tapered flange or boss 38. The rear end of the extension 34 is provided with an annular groove which receives an O-ring 40 which is adapted to abut against the front end of the missile tube 16 when the parts are secured together by a clamp assembly 42 of the same general design as the clamp assembly 30. The inner surface of the cylindrical extension 34 is additionally provided with a radially outwardly extending annular cut out portion 44 which is utilized to receive a portion of the maintaining means which maintains the survival canister assembly 12 within the missile tube 16.

Figure 2:
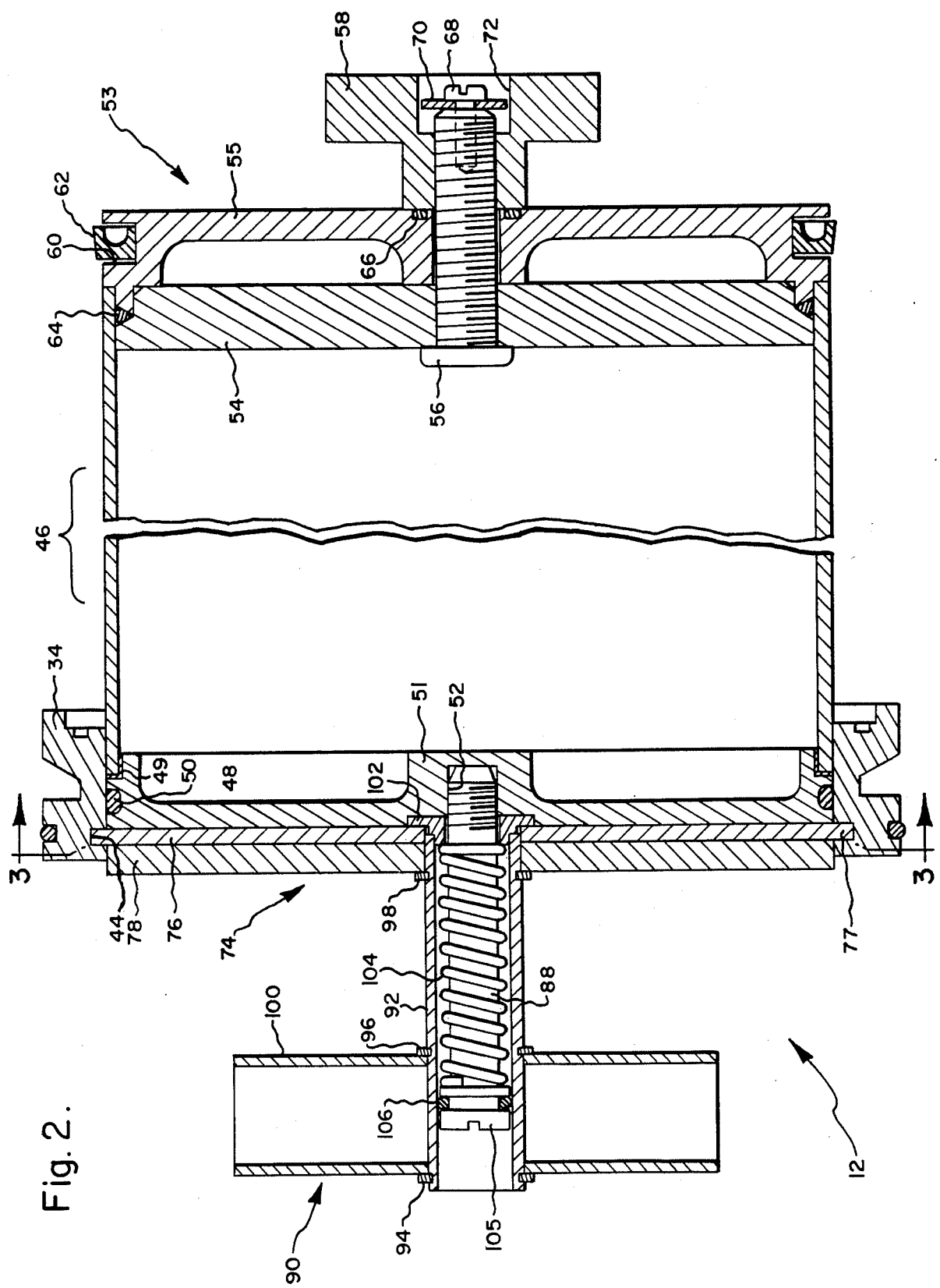
FIG. 2 is a view similar to FIG. 1 showing the survival canister assembly in greater detail.

The survival canister assembly 12 is best shown in FIG. 2 and includes a canister tube 46 of cylindrical cross section, the front end of the tube being closed by a front end cap 48 which has an outside diameter approximately the same as the outside diameter of the tube 46. A rear portion of the end cap 48 is suitably sealed by an epoxy cement 49 or the like to the very front portion of the canister tube 46. An O-ring 50 is disposed within an annular groove on the exterior surface of the front end cap 48 and bears against the inner cylindrical wall of extension 34. The front end cap 48 is additionally provided with a centrally located hub portion 51 having a suitable threaded bore 52 for reasons which will be brought out below.

Suitable survival gear is stowed within the canister tube 46 and is maintained in place by a rear cap assembly indicated generally at 53. The end cap assembly includes an end cap 54 and a concentric piston 55, the parts being held together by a bolt 56 and a threaded knob 58 which is threaded onto the end of the bolt 56. The bolt 56 is adhesively secured within a centrally located aperture in the end cap 54. The piston is provided with an annular groove 60 which receives a packing ring 62 which bears against the inside cylinder wall of the missile tube 16 as best shown in FIG. 1. In order to maintain the parts assembled in a closed and sealed configuration, an O-ring 64 (FIG. 2) is disposed between adjacent peripheral flanged portions of the end cap 54 and piston 55 and when the knob 58 is screwed down onto the end face of the piston 55 (which is provided with a further O-ring 66), the O-ring 64 will be forced radially outwardly against the inner surface of the tube 46 to maintain the end cap 54 within the rear end of the tube 46. When the tube 46 is loaded with suitable survival gear and sealed by the front end cap 48 and the rear end cap assembly 53, the assembly will be water tight. In addition, the water tight assembly and included survival gear is designed to be buoyant.

To remove the end cap 54 and piston 55 it is only necessary to unscrew the knob 58 a couple of turns at which point the loading on the O-ring 64 will be released sufficiently to permit the parts to be withdrawn from the rear end of the canister tube 46. A screw 68 and washer 70 are secured to the bolt 56 and are disposed within an aperture 72 in the knob 58 and merely serve to retain the knob 58 in place if it is unscrewed. After the end cap assembly 53 is removed, the survival gear may be withdrawn from the tube 46.

As previously noted, the cylindrical extension 34 at the front end of the missile tube 16 is provided with an annular cutout 44 which receives a portion of a maintaining means, which is indicated generally at 74, and which is carried by the front end of the survival canister assembly. The maintaining means includes a spider 76 (FIGS. 2 and 3) which has end portions 77 disposed within the annular cutout 44. The spider, which is made of nylon or a similar material, is disposed between a retaining plate 78 and the front end cap 48. The maintaining means 74 includes a threaded stem 88, which is screwed into bore 52. Disposed about the threaded stem 88 are manual engaging means, indicated generally at 90, which both engage the survival canister assembly 12 (FIG. 1) and also are capable of releasing the maintaining means 74. The manual engaging means include a tube 92 provided with suitable retaining rings 94, 96 and 98. A handle 100 is disposed between the retaining rings 94, 96. The retaining ring 98 abuts against the front end of the retaining plate 78. The rear end of the tube 92 is in turn secured to a flanged element 102, the flanged element bearing against a rear central portion of the spider 76. Disposed about the threaded stem 88 is a compression spring 104, the front end of the compression spring bearing against the head portion 105 of the stem, the stem adjacent the head portion in turn being provided with an annular groove which receives O-ring 106.

To manually release the survival canister assembly 12 (FIG. 1) from the missile tube 16 (FIG. 1), it is only necessary to pull on the handle 100 which will cause the flanged element 102 to bear against the spider 76, bowing it to the left as viewed in FIG. 2 until the end portions 77 are pulled out of the annular cutout 44 at which time the whole canister assembly 12 can be pulled from the missile tube.

In some situations the occupants of a helicopter do not have time to retrieve survival equipment from the helicopter in the event of a crash into water in which case it is desirable that the survival canister be automatically ejected. To this end, the gas discharge apparatus 14 is provided between the conical member 18 and the piston 55 which, in operation, will sufficiently pressurize the closed rear end of the missile tube and the piston to cause the end portions 77 of the spider to shear thereby permitting the survival canister assembly 12 to be forceably ejected from the missile tube.

The gas discharge apparatus 14 includes a pair of compressed gas cylinders 108 (FIG. 4) which are mounted in a bottle mounting member 110. The bottle mounting member in addition receives a primer 112 (FIG. 5) and a pair of closure piercing pistons 114, one for each cylinder, the pistons being disposed within bores 115. Mounted on the bottle mounting member is an electronics package 116 (FIG. 1) which includes a pair of batteries 118 and electronics (not shown) which may be of the same type shown in U.S. Pat. No. 4,024,440, the subject matter of which is incorporated herein by reference thereto. A lead wire 120 extends from the electronics package 116 to the sensor plug assembly 22. The sensor plug assembly includes a sensor 122 disposed within an apertured protective closure 124. When the assembly shown in FIG. 1 is placed in water a circuit is completed between the sensor 122 and the rear end face 126 of the bottle mounting member 110. To this end it should be noted that the mounting member or body 110 is made of an electrically conductive material such as aluminum and additionally that the end face 126 is not coated or anodized. The end face 126 is disposed at the rear end of a cylindrical threaded portion 128 (FIG. 4) which is screwed into the threaded aperture 20 of the conical member 18. A ground contact pin 130 (FIG. 5) is carried by the body and is in electrical contact with the electronics in the electronics package 116. Similarly, the primer 112 is also provided with an electrical contact 132 which is in turn in electrical contact with the electronics in the electronics package 116 (FIG. 1). When an electrical circuit is completed, the primer 112 will be ignited causing the closure piercing pistons to be driven into a pierceable closure 134 adjacent the threaded end of each of the compressed gas cylinders 108. Thus, each of the bottles is screwed into a threaded port 136 in the body 110, the bottle being held in gas tight relationship therein by virtue of an O-ring 138. The body includes, in addition to the plurality of cylindrical bores 115 which extend away from the ports 136, primer receiving bore 140 which receives primer 112. Each piston includes a grooved piercing pin portion 144 and a groove which receives an O-ring 146. Each piston 114 is normally biased away from the pierceable closure by a compression spring 148, the forward end of which bears against a portion of a retainer plug 150 disposed within an enlarged portion of the cylindrical bore 115. The body is also provided with a plurality of gas passageways 152 which extend away from the primer receiving bore to the cylindrical bores at a location remote from said ports. The gas passageways may be formed by drilling through the body from a side 154 of the body 110 and may then be closed by tapping the passageway between the bore 115 and the side 154 and inserting a set screw 156 therein. The electronics package is secured to one side of the body 110 by suitable fasteners 160 (only two of which are shown), the fasteners being in turn received within apertures 162.

In operation, the canister tube is loaded with suitable survival equipment and then the rear end is closed by the end cap assembly 53. The assembly is then inserted into a missile tube.

If it is desired to manually remove the survival canister assembly 12 from the missile tube after insertion, it is only necessary to pull on the handle 100 which will cause the spider end portions 77 to be withdrawn from the annular cutout 44 in the cylindrical extension 34 then permitting the entire removal of the canister assembly. In the event that the helicopter carrying the survival apparatus of this invention should land in water, a circuit will be completed between the sensor 122 and the rear end face 126 of the bottle mounting member 110 causing electronics to fire the primer in a manner which is more completely explained in U.S. Pat. No. 4,024,440. When this happens, gas will be discharged by the primer through the passageways 152 forcing the closure piercing pistons into the pierceable closures 134 of the compressed gas cylinders 108. This will permit gas to be discharged from the cylinders which will in turn exit through the discharge passageways 164, there being two such passageways disposed to either side of the grooved piercing pin portion 144 of each piston. Gas will now flow into the chamber defined by the piston 55, rear end portion of missile tube 16 and conical member 18 until the pressure builds up sufficiently to cause the spider end portions 77 to shear, the survival canister assembly 12 then being forcibly ejected from the missile tube. Once ejected, the assembly 12 will float to the top of the water. It is now only necessary for the crew to unscrew the knob 58 sufficiently to withdraw the end cap assembly 53 from the tube 46 thereby gaining access to the survival equipment disposed within the canister tube 46.

While a preferred structure in which the principles of the present invention have been incorporated is shown and described above, it is to be understood that widely differing means may be employed in the broader aspects of this invention. For example, when used over land, a different sensing apparatus may be utilized which can be either a heat sensitive sensor or an accelerometer that would sense the sudden impact of a helicopter upon the ground. Other variations will occur to those skilled in the art. Accordingly, this invention is intended to embrace all such alternatives, modifications and variation which fall within the spirit and scope of the appended claims.

What is claimed is:

1. Gas discharge apparatus (14) comprising:
   a plurality of compressed gas bottles (108) each having a pierceable closure (134) at one end;
   a bottle mounting member (110) having
     a plurality of ports (136) to which the bottles are secured,
     a plurality of cylindrical bores (115) extending away from said ports,
     a primer receiving bore (140),
     a plurality of gas passageways (152) extending from said primer receiving bore to the cylindrical bores at a location remote from said ports, and
     a plurality of discharge passageways (164) extending from the surface of the mounting member to the cylindrical bores at a location adjacent said ports;
   a plurality of closure piercing pistons (114), one disposed in each cylindrical bore and having a piercing pin portion (144) extending towards said port;
   a primer (112) disposed within said primer receiving bore; and water activated condition responsive means (22, 116) capable of
     igniting said primer in response to an accident which places the apparatus in water, said primer when ignited causing the piercing pin portion of said pistons to be driven into said pierceable closures whereby gas is released from said bottles.

2. Survival apparatus (10) comprising:
   a cylindrical member (16) open at one end and closed at the other end;
   a survival canister assembly (12) disposed within said cylindrical member;
   maintaining means (74) engaging said cylindrical member and said survival canister assembly and capable of normally maintaining said canister assembly within said cylindrical member;
   piston means (55) disposed within said cylindrical member between the canister assembly and the closed end of said cylindrical member; and
   gas discharge means (14) including water activated condition responsive means (22, 16), said gas discharge means being capable in response to an accident which places the apparatus in water of driving said piston means away from the closed end of said cylindrical member to cause the canister assembly to be rapidly ejected from the cylindrical member, said water activated condition responsive means including a sensor (22), said sensor projecting outwardly of said cylindrical member.

3. The survival apparatus as set forth in claim 2 wherein the cylindrical member is provided with an internal annular groove (44), said annular groove being engaged by said maintaining means.

4. The survival apparatus as set forth in claim 2 further characterized by the provision of manually engageable means (90) engaging the maintaining means and the canister assembly and capable upon application of force in one direction of releasing the maintaining means and withdrawing the canister assembly from the cylindrical member.

5. The survival apparatus as set forth in claim 4 wherein the maintaining means is supported by one end of said survival canister assembly.

6. The survival apparatus as set forth in claim 5 wherein the cylindrical member is provided with an internal annular groove (44), the maintaining means including a spider 76 having radially outer end portions (77) disposed within said groove.

7. The survival apparatus as set forth in claim 2 wherein the piston means is carried by the end of the survival canister assembly adjacent the closed end of the cylindrical member.

8. The survival apparatus as set forth in claim 2 wherein the survival canister assembly includes an end cap assembly (53) disposed adjacent the closed end of the cylindrical member, the piston means being integrated into the end cap assembly (53).

9. The survival apparatus as set forth in claim 2 wherein the gas discharge means (14) includes a plurality of compressed gas bottles (108), each having a pierceable closure (134) at one end, a bottle mounting member (110) including a plurality of cylindrical bores (115) which terminate in ports (136), said compressed gas bottles being interconnected to said ports, a plurality of piercing pin pistons (114), one disposed in each piercing pin cylindrical bore, each piston having a piercing pin portion (144) extending towards the pierceable closure in an associated compressed gas bottle, and actuating means (22, 112, 116) capable of driving the piercing pin portion of said piercing pin pistons into the pierceable closures in response to an accident which places the survival apparatus in water to cause gas to be discharged from said compressed gas bottles.

10. The survival apparatus as set forth in claim 9 wherein said actuating means includes an explosive primer (112) carried by said bottle mounting member, said water activated condition responsive means being capable of causing said explosive primer to be ignited when an accident occurs which places the survival apparatus in water to cause gas to be discharged from said primer to force the piercing pin pistons towards said compressed gas bottles.

11. Survival apparatus (10) comprising:
a cylindrical member (16) open at one and closed at the other end, the cylindrical member being provided with an internal annular groove (14);
a survival canister assembly (12) disposed within said cylindrical member;
maintaining means (74) supported by one end of said survival canister assembly and engaging said cylindrical member and said survival canister assembly and capable of normally maintaining said canister assembly within said cylindrical member, the maintaining means including a spider (76) having radially outer end portions (77) disposed within said groove;
piston means (55) disposed within said cylindrical member between the canister assembly and the closed end of said cylindrical member;
gas discharge means (14) capable of driving said piston means away from the closed end of said cylindrical member in response to an accident to cause the canister assembly to be ejected from the cylindrical member when an accident occurs; and
manually engageable means (90) engaging the maintaining means and the canister assembly and capable upon application of force in one direction of releasing the maintaining means and withdrawing the canister assembly from the cylindrical member and wherein said manually engageable means is carried by the survival canister assembly concentric with the maintaining means.

12. The survival apparatus as set forth in claim 11 wherein the manually engageable means include a handle (100), and means (102) interconnecting the handle with a hub portion of the spider and capable of bowing the spider upon application of force in one direction to the handle to permit the withdrawal of the spider end portions from the annular groove.

13. Survival apparatus comprising:
a cylindrical member (16);
a survival canister assembly (12);
maintaining means (74) carried by one end of the canister assembly and capable of maintaining the canister assembly within cylinder (16), the maintaining means including a resilient spider (76) having a plurality of spaced apart spider end portions (77) which are capable of engaging a portion of the cylindrical member to maintain the canister assembly within the cylindrical member; and
manually engageable means carried by one end of the canister assembly and capable of engaging the maintaining means (74) to permit the withdrawal of the canister assembly from the cylindrical member, wherein the manually engageable means (90) is also capable of moving the spaced apart spider end portions (77) radially inwardly to permit the withdrawal of the canister assembly (12) from said cylindrical member, said manually engageable means further including a handle assembly (100) normally spring biased toward said canister assembly.

14. The survival apparatus as set forth in claim 13 wherein the canister assembly further includes an end cap assembly (53), which is removable from the canister assembly to permit access to the survival equipment within said canister.

15. Survival apparatus (10) comprising:
a cylindrical member (16) open at one end and closed at the other end;
a survival canister assembly (12) disposed within said cylindrical member;
maintaining means (74) engaging said cylindrical member and said survival canister assembly and capable of normally maintaining said canister assembly within said cylindrical member;
and end cap assembly (53) disposed adjacent the closed end of the cylindrical member, the end cap assembly including piston means (55) disposed within said cylindrical member between the canister assembly and the closed end of said cylindrical member, and wherein the end cap assembly further includes an end cap (54), the piston means and end cap being relatively movable towards and away from each other, means (56, 58) capable of biasing the piston means and end cap towards each other, and locking means (64) supported by the end cap and piston means and capable of being forced radially outwardly when the piston means is moved towards the end cap to secure the end cap assembly within said end of the survival canister assembly; and
gas discharge means (14) capable of driving said piston means away from the closed end of said cylindrical member in response to an accident to cause the canister assembly to be ejected from the cylindrical member when an accident occurs.

* * * * *